United States Patent
Hirata et al.

(10) Patent No.: US 10,716,286 B2
(45) Date of Patent: Jul. 21, 2020

(54) LITTER BOX

(71) Applicant: SHARP KABUSHIKI KAISHA, Sakai, Osaka (JP)

(72) Inventors: Masayuki Hirata, Sakai (JP); Ayako Sekine, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 205 days.

(21) Appl. No.: 16/069,335

(22) PCT Filed: Feb. 6, 2017

(86) PCT No.: PCT/JP2017/004276
§ 371 (c)(1),
(2) Date: Jul. 11, 2018

(87) PCT Pub. No.: WO2017/150086
PCT Pub. Date: Sep. 8, 2017

(65) Prior Publication Data
US 2019/0021273 A1   Jan. 24, 2019

(30) Foreign Application Priority Data
Feb. 29, 2016 (JP) .................................. 2016-038260

(51) Int. Cl.
*A01K 1/00* (2006.01)
*A01K 1/01* (2006.01)
*A01K 29/00* (2006.01)
*G01G 17/00* (2006.01)

(52) U.S. Cl.
CPC .......... *A01K 1/0114* (2013.01); *A01K 29/005* (2013.01); *G01G 17/00* (2013.01)

(58) Field of Classification Search
CPC ........ A01K 1/00; A01K 1/0107; A01K 1/011; A01K 1/014
USPC ................................ 119/161, 165, 166, 168
See application file for complete search history.

(56) References Cited

U.S. PATENT DOCUMENTS

| | | | | |
|---|---|---|---|---|
| 3,921,582 A | * | 11/1975 | Sedlmeir | A01K 1/0107 119/161 |
| 4,729,342 A | * | 3/1988 | Loctin | A01K 1/011 119/163 |
| 5,113,801 A | * | 5/1992 | Rotstein | A01K 1/011 119/163 |

(Continued)

FOREIGN PATENT DOCUMENTS

JP    2011-004664 A    1/2011

*Primary Examiner* — Richard T Price, Jr.
(74) *Attorney, Agent, or Firm* — ScienBiziP, P.C.

(57) ABSTRACT

A weight of an excretion of an animal is easily measured. A pet toilet (1) includes a supporting table (12) onto which the animal is to step, an excretion tray (13) configured to receive urine of the animal which urine falls from the supporting table (12), a first weight scale (1) configured to measure a weight of the excretion tray (13) including a weight of the urine, and a carrier member (16) configured to carry the excretion tray (13). The excretion tray (13) and the carrier member (16) are provided to be attachable together by insertion between the first weight scale (21) and the supporting table (12). A weight of the carrier member (16) is supported by the main container (10) and the first weight scale (21) supports the excretion tray (13), in a state where the excretion tray (13) is attached by insertion.

9 Claims, 8 Drawing Sheets

(56) References Cited

U.S. PATENT DOCUMENTS

| | | | | |
|---|---|---|---|---|
| 5,494,001 | A * | 2/1996 | Leibowitz | A01K 1/011 119/163 |
| 6,205,954 | B1 * | 3/2001 | Bogaerts | A01K 1/0114 119/166 |
| 7,958,846 | B2 * | 6/2011 | Axelrod | A01K 1/011 119/161 |
| 8,578,886 | B1 * | 11/2013 | Delisle | A01K 1/0107 119/165 |
| 10,076,098 | B2 * | 9/2018 | Matsuo | A01K 1/0114 |
| 2004/0144325 | A1 * | 7/2004 | Schrader | A01K 31/04 119/161 |
| 2006/0225659 | A1 * | 10/2006 | Axelrod | A01K 1/011 119/164 |
| 2009/0241850 | A1 * | 10/2009 | Campbell | A01K 1/011 119/164 |
| 2015/0053139 | A1 * | 2/2015 | Dustin | E04F 21/00 119/161 |

* cited by examiner

LITTER BOX

TECHNICAL FIELD

The present invention relates to an animal toilet.

BACKGROUND ART

Patent Literature 1 discloses a pet toilet including (i) partition layer which allows urine to pass therethrough and (ii) tray which is provided beneath the partition layer so as to receive the urine. The tray has an opening via which the urine in the tray is poured out.

CITATION LIST

Patent Literature

[Patent Literature 1]
Japanese Patent Application Publication Tokukai No. 2011-004664

SUMMARY OF INVENTION

Technical Problem

In order to measure a weight of an excretion of an animal in a configuration disclosed in Patent Literature 1, it is necessary to (i) draw out the tray from the pet toilet and (ii) place the tray on a weight scale which is provided separately from the pet toilet. Therefore, a great amount of effort was required to measure a weight of an excretion of a pet.

The present invention was made in view of the above problem, and an object of the present invention is to provide an animal toilet which facilitates measurement of a weight of an excretion of an animal.

Solution to Problem

In order to attain the above object, an animal toilet in accordance with an embodiment of the present invention includes: a supporting table onto which an animal is to step; a measurement tray configured to receive an excretion of the animal which excretion falls from the supporting table; a weight scale configured to measure a weight of the measurement tray; and a carrier member configured to carry the measurement tray, the measurement tray and the carrier member being provided to be attachable together by insertion between the weight scale and the supporting table, and (i) the carrier member being supported by a member other than the weight scale and (ii) the weight scale supporting the weight of the measurement tray, in a state where the measurement tray is attached by insertion between the weight scale and the supporting table.

Advantageous Effects of Invention

An aspect of the present invention makes it possible to provide an animal toilet which facilitates measurement of a weight of an excretion of an animal.

BRIEF DESCRIPTION OF DRAWINGS

FIG. 1A is a plan view of the pet toilet.
FIGS. 1B and 1C are each a lateral view of the pet toilet.
FIG. 1D is a front view of the pet toilet.

DESCRIPTION OF EMBODIMENTS

Embodiment 1

Figure 1:
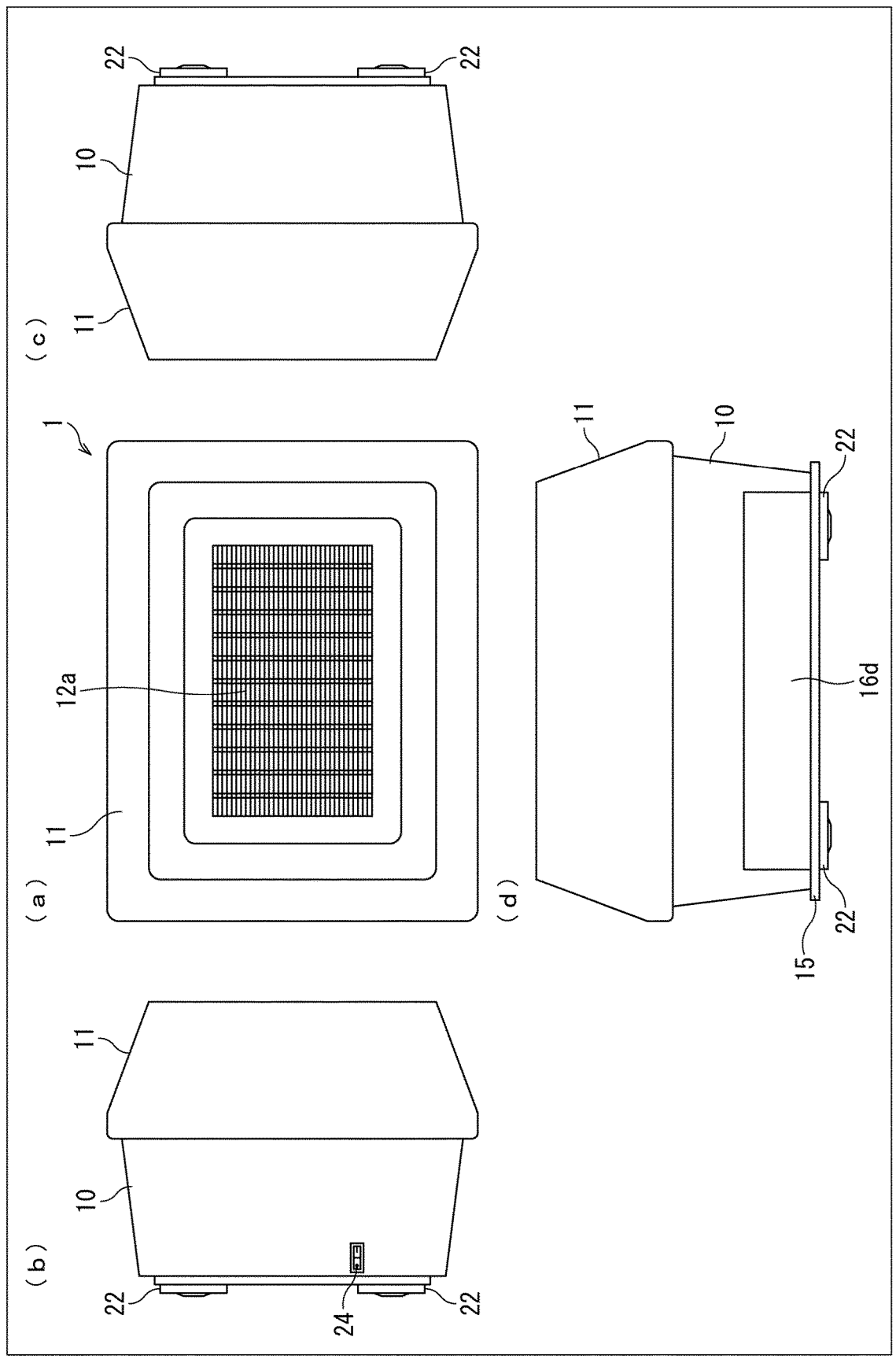
FIG. 1 is a view illustrating a configuration of a pet toilet in accordance with Embodiment 1 of the present invention.
Figure 2:
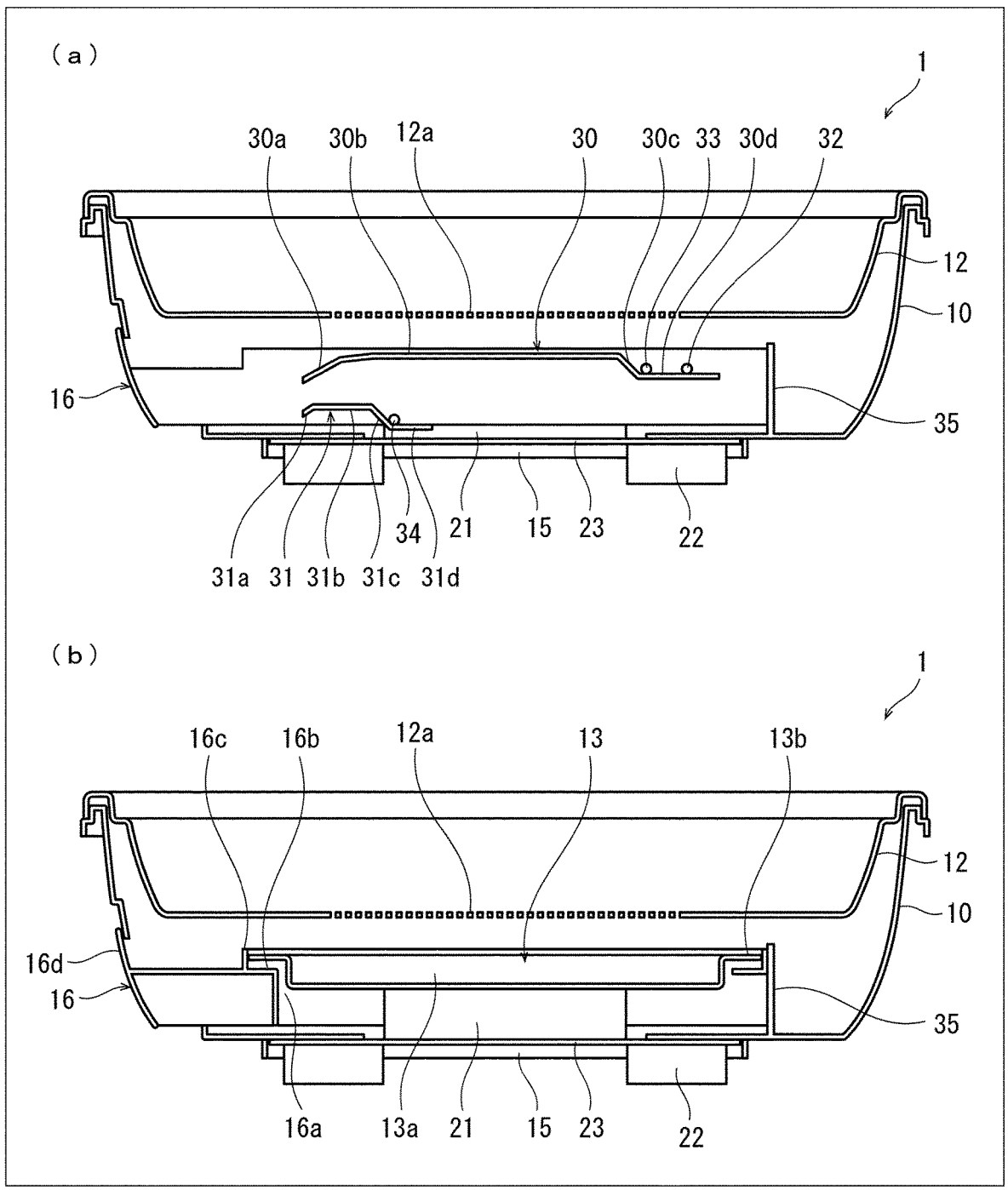
FIGS. 2A and 2B is a cross-sectional view of the pet toilet illustrated in FIG. 1, the cross-sectional view being taken in a direction in which a carrier member is attached.
Figure 3:
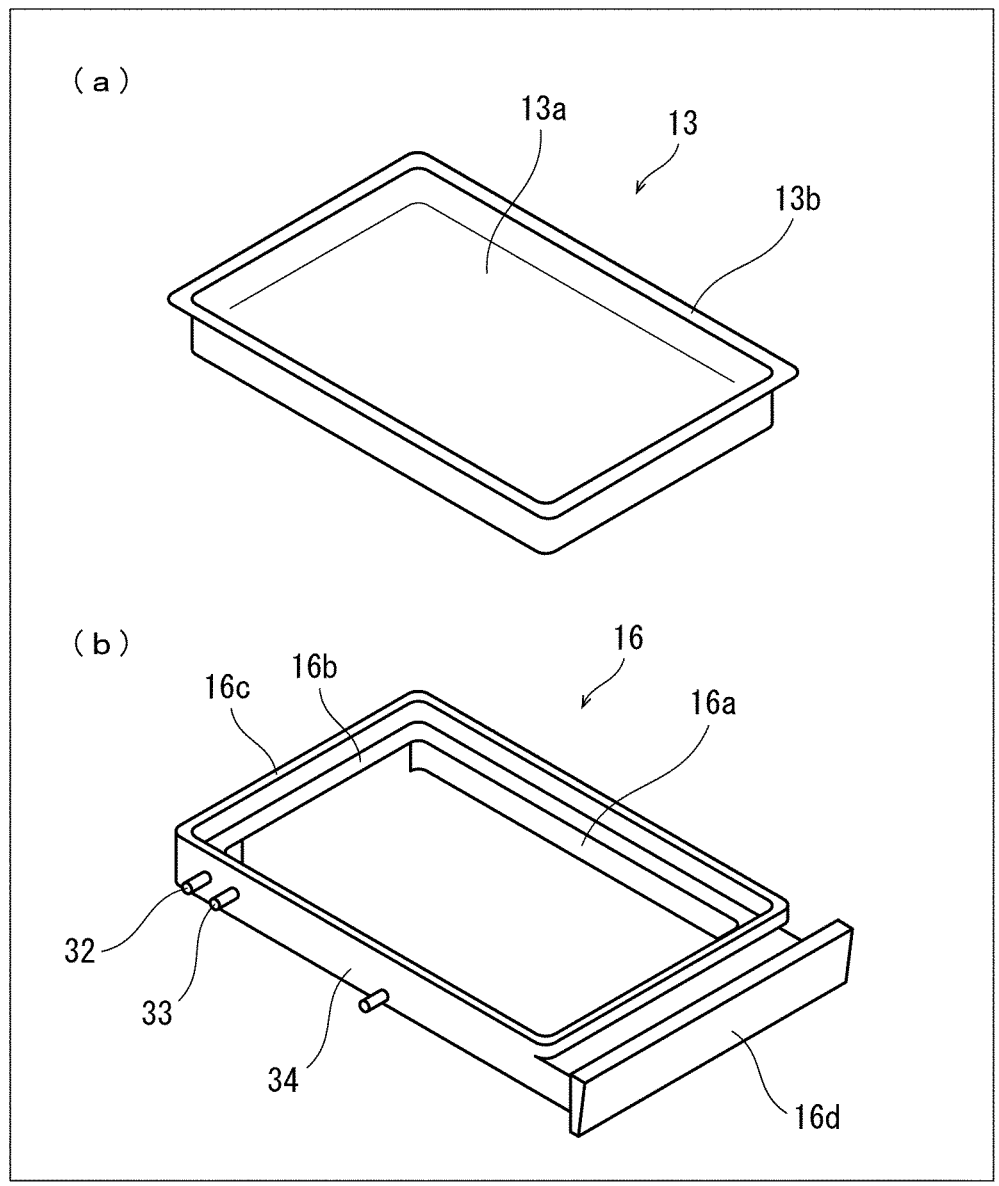
FIG. 3A is a perspective view of an excretion tray and FIG. 3B is a perspective view of the carrier member the carrier member of the pet toilet illustrated in FIG. 1.
Figure 4:
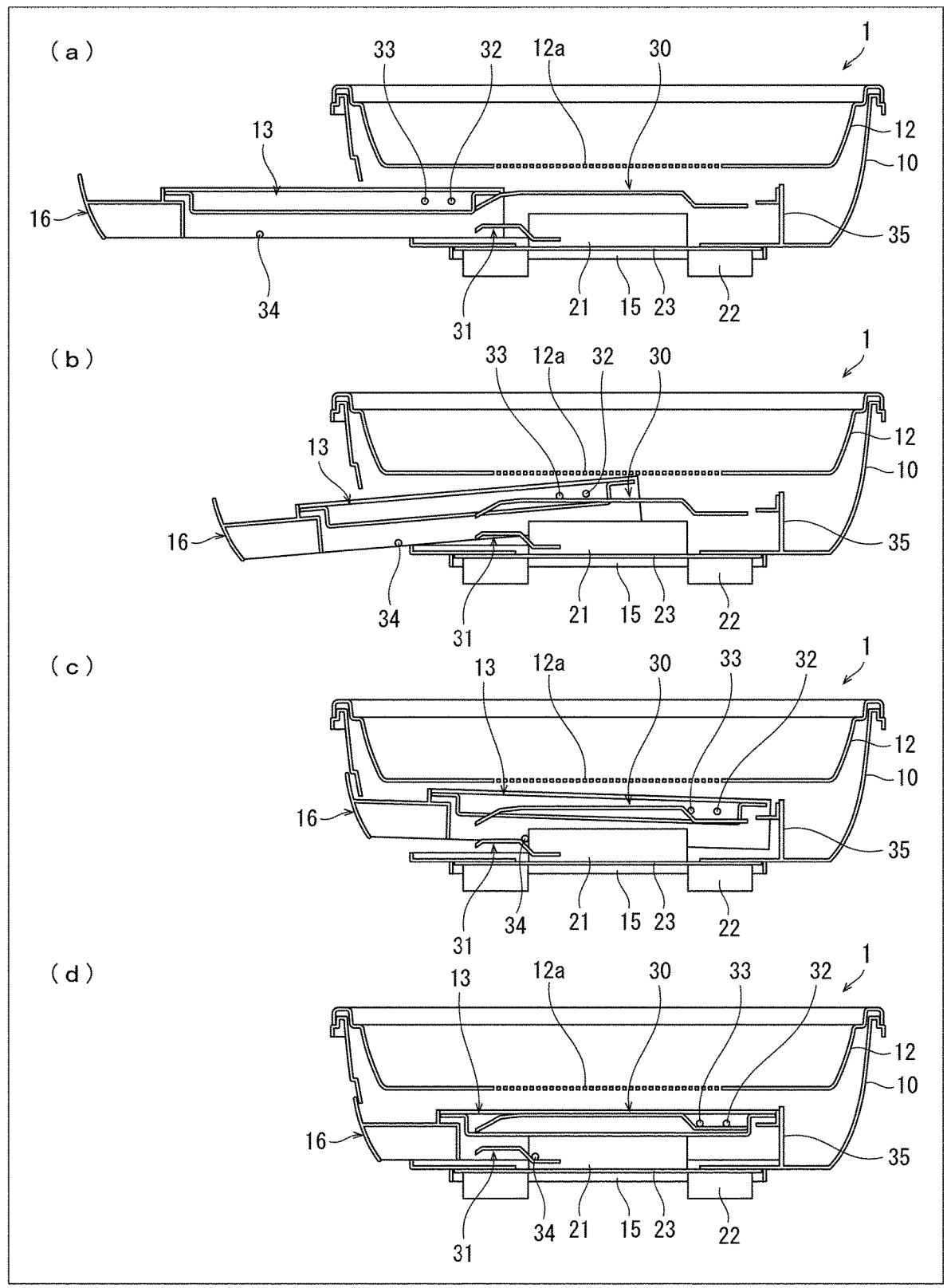
FIGS. 4A-4D is a cross-sectional view illustrating how the excretion tray and the carrier member are attached to the pet toilet illustrated in FIG. 1.

(Configuration of Animal Toilet)
FIG. 1 is a view illustrating a configuration of a pet toilet in accordance with Embodiment 1. (a) of FIG. 1 is a plan view of a pet toilet 1. (b) and (c) of FIG. 1 are each a lateral view of the pet toilet 1. (d) of FIG. 1 is a front view of the pet toilet 1. FIG. 2 is a cross-sectional view of the pet toilet 1, the cross-sectional view being taken in a direction (i.e., attachment direction) in which a carrier member 16 is attached. (a) of FIG. 2 is a cross-sectional view of a boundary part between the carrier member 16 and a main container 10. (b) of FIG. 2 is a cross-sectional view of a center part of the carrier member 16. FIG. 3 is a perspective view of an excretion tray 13 and the carrier member 16. FIG. 4 is a cross-sectional view illustrating how the excretion tray 13 and the carrier member 16 are attached to the pet toilet 1. (a) of FIG. 4 illustrates how the attachment is started. (b) of FIG. 4 illustrates how the excretion tray 13 is lifted above a first weight scale 21. (c) of FIG. 4 illustrates how the excretion tray 13 starts to be separated from the carrier member 16. (d) of FIG. 4 illustrates a state where the separation and the attachment are completed.

The pet toilet 1 (animal toilet) serves as a measurement device which measures (i) a weight of an animal (i.e., pet) and (ii) a weight of an excretion of the animal. The pet toilet 1 includes the main container 10 (member other than weight scale), a cover 11, a supporting table 12, the excretion tray 13 (measurement tray), an absorbing sheet 14, a supporting member 15, the carrier member 16, the first weight scale 21 (weight scale), second weight scales 22, and a control device 23. Note that the cover 11 is omitted in each of FIGS. 2 through 4.

The main container 10 supports the cover 11, the supporting table 12, and the carrier member 16. The main container 10 has a bottom part and a side surface (i.e., front surface). The bottom part has a hole which is secured in its central region (i.e., a region corresponding to the first weight scale 21). The side surface of the main container 10 has a space via which the excretion tray 13 and the carrier member 16 are each attachable and detachable. In the main container 10, there are provided (i) a pair of first guide rails 30 (attachment guide), (ii) a pair of second guide rails 31, and (iii) a barrier wall 35. The pair of first guide rails 30 and the pair of second guide rails 31, which allow the carrier member 16 to slide (i.e., to be attached to and detached from the main container 10), are provided on opposite inner side surfaces of the main container 10. The barrier wall 35 serves to stop attachment of the carrier member 16.

The cover 11 is a cover which covers four lateral sides of the animal on the pet toilet 1. However, the cover 11 is not limited as such, and can alternatively be a cover which covers, for example, three lateral sides of the animal on the pet toilet 1.

The supporting table 12 is a table onto which the animal steps and excretes. The supporting table 12 has a mesh 12a provided in its bottom surface. The mesh 12a allows an excretion (e.g., urine) of the animal to pass therethrough. The excretion then falls onto the excretion tray 13. The supporting table 12 can be configured to have a water repellency which makes urine (i) to easily flow and (ii) not to attach to and accumulate in the supporting table 12. The mesh 12a in accordance with Embodiment 1 allows a liquid to pass therethrough, but does not allow feces, an object (e.g., toy) which an animal holds in its mouth, and the like to pass therethrough. Note that, instead of the mesh 12a, a hole can be alternatively secured, in the supporting table 12, which allows the excretion to pass therethrough. The supporting table 12 in accordance with Embodiment 1 is shaped like a recessed container. However, the supporting table 12 is not limited as such.

The excretion tray 13 is a member which receives an excretion. The excretion tray 13 is located, beneath the supporting table 12, in a given location between the first weight scale 21 and the supporting table 12. An area, in which the excretion tray 13 can receive the excretion, includes (i.e., is wider than) a region in which the mesh 12a of the supporting table 12 is provided. The absorbing sheet 14 can be provided in the excretion tray 13. The absorbing sheet 14 is a sheet (holding member) which absorbs (holds) a liquid such as urine. The carrier member 16 allows the excretion tray 13 to be attached to and detached from the main container 10, via the space secured in the side surface of the main container 10.

The supporting member 15 is a stand plate which supports the first weight scale 21 and the main container 10. In Embodiment 1, the control device 23 is provided on the supporting member 15, and the first weight scale 21 is provided on the control device 23. The supporting member 15 can thus support the first weight scale 21 via the control device 23.

The carrier member 16 is a member which carries the excretion tray 13 while the excretion tray 13 is being attached to and detached from the main container 10. The carrier member 16 supports the excretion tray 13 while the excretion tray 13 is being carried. However, the excretion tray 13 is separated from the carrier member 16 when the excretion tray 13 reaches a given location beneath the supporting table 12. The carrier member 16 can be attached to and detached from the main container 10 while carrying the excretion tray 13, via the space secured in the side surface of the main container 10.

The first weight scale 21 is in contact with the excretion tray 13, via the hole secured in the bottom part of the main container 10, so as to support the excretion tray 13.

Examples of the first weight scale 21 include a load cell. The first weight scale 21 measures a weight of the excretion tray 13 including respective weights of the absorbing sheet 14 and the excretion. Respective weights of the supporting table 12 and the animal are not exerted on the excretion tray 13. The first weight scale 21 supplies a measured weight to the control device 23. Note that, although a single first weight scale 21 is provided in Embodiment 1, a plurality of first weight scales 21 can alternatively be provided which measure the weight of the excretion tray 13.

The second weight scales 22 support a structure which at least includes the supporting table 12. In Embodiment 1, four second weight scales 22 are provided beneath the supporting member 15. Lower ends of the respective second weight scales 22 are in contact with, for example, a floor so that the second weight scales 22 support the supporting member 15. The second weight scales 22 support a structure which includes the supporting table 12, the main container 10, the cover 11, the supporting member 15, the carrier member 16, the control device 23, the first weight scale 21, and the excretion tray 13. Examples of the second weight scales 22 include a load cell. The second weight scales 22 measure a total weight of (i) the structure including the supporting table 12, the main container 10, the cover 11, the supporting member 15, the carrier member 16, the control device 23, the first weight scale 21, and the excretion tray 13 and (ii) the animal. The second weight scales 22 supplies a measured weight to the control device 23.

Based on respective weights measured by the first weight scale 21 and the second weight scales 22, the control device 23 calculates the respective weights of the animal and the excretion. The control device 23 in accordance with Embodiment 1 includes a housing which houses therein components such as a control substrate. The control device 23 includes a power switch 24.

(Configurations of Excretion Tray and Carrier Member)

The following description will first discuss respective configurations of the excretion tray 13 and the carrier member 16.

As illustrated in (a) of FIG. 3, the excretion tray 13 is composed of (i) a receiving part 13a which receives the excretion of the animal and (ii) a placement part 13b which is to be placed on the carrier member 16. In Embodiment 1, the receiving part 13a is a recess in which the absorbing sheet 14 is to be placed, and the placement part 13b is a horizontal part which surrounds the receiving part 13a. Although not illustrated, a rib is provided, in the attachment direction, on a bottom surface of the receiving part 13a. The rib reduces a friction which prevents the excretion tray 13 from sliding when the excretion tray 13 slides on the first weight scale 21.

As illustrated in (b) of FIG. 3, the carrier member 16 has (i) an opening 16a in which the receiving part 13a of the excretion tray 13 is to be fitted, (ii) a placement part 16b on which the placement part 13b of the excretion tray 13 is to be placed, (iii) a rising part 16c which defines a horizontal location of the excretion tray 13, and (iv) a handle part 16d, provided upstream of the attachment direction, which serves as a handle during the attachment and the detachment.

Since the carrier member 16 carries the excretion tray 13 while placing thereon the excretion tray 13, (i) the carrier member 16 and the excretion tray 13 each have a simple configuration and (ii) the excretion tray 13 can be easily separated from the carrier member 16. This facilitates, for example, cleaning and sterilization of the carrier member 16 and the excretion tray 13.

There are provided, on each of both side surfaces of the carrier member 16 in the attachment direction, (i) a first guide pin 32 and a second guide pin 33 which correspond to a corresponding first guide rail 30 and are located downstream of the attachment direction in which the carrier member 16 is attached to the main container 10 and (ii) a third guide pin 34 which corresponds to a corresponding second guide rail 31 and is located upstream of the attachment direction. Embodiment 1 discusses the case where the first through third guide pins 32 through 34 are each a cylindrical projection, but Embodiment 1 is not limited as such. Alternatively, each of the first through third guide pins 32 through 34 can be, for example, a rib, provided that they can slide on the first and second guide rails 30 and 31.

(Attachment of Excretion Tray and Carrier Member)

The following description will discuss how the excretion tray 13 and the carrier member 16 are attached by insertion between the supporting table 12 and the first weight scale 21.

As illustrated in (a) of FIG. 4, a user places the excretion tray 13 on the carrier member 16 so that the excretion tray 13 and the carrier member 16 slide together. The user grips the handle part 16d of the carrier member 16, and starts to attach the carrier member 16 and the excretion tray 13 together to the space secured in the side surface of the main container 10. Subsequently, the first guide pin 32 reaches a leading part 30a of the first guide rail 30. This causes the first guide pin 32 and the second guide pin 33 to slide on the first guide rail 30.

As illustrated in (b) of FIG. 4, the leading part 30a of the first guide rail 30 is inclined so as to rise toward downstream of the attachment direction. This causes respective parts of the carrier member 16 and the excretion tray 13, which parts are located downstream of the attachment direction, to be lifted while the carrier member 16 and the excretion tray 13 are attached to the main container 10. The leading part 30a of the first guide rail 30 is connected to a substantially horizontal upper part 30b (part of attachment guide). The user continues to attach the carrier member 16 and the excretion tray 13 by insertion so that the first guide pin 32 and the second guide pin 33 slide on the upper part 30b of the first guide rail 30.

Subsequently, the third guide pin 34 reaches a leading part 31a of the second guide rail 31. This causes the third guide pin 34 to slide on the second guide rail 31. The leading part 31a of the second guide rail 31 is inclined so as to rise toward downstream of the attachment direction. This causes a part of the carrier member 16, which part is located upstream of the attachment direction, to be lifted while the carrier member 16 and the excretion tray 13 are attached to the main container 10. The leading part 31a of the second guide rail 31 is connected to a substantially horizontal upper part 31b. The user continues to attach the carrier member 16 and the excretion tray 13 by insertion so that the third guide pin 34 slides on the upper part 31b of the second guide rail 31.

The carrier member 16 thus lifts the excretion tray 13 above the first weight scale 21 so that the excretion tray 13 does not make contact with the first weight scale 21. The upper part 31b of the second guide rail 31 is connected to a transition part 31c, which is inclined so as to decline toward downstream of the attachment direction.

As illustrated in (c) of FIG. 4, the first guide pin 32 and the second guide pin 33 slide on a transition part 30c of the first guide rail 30 so as to fall down. This causes the carrier member 16 and the excretion tray 13 to come down due to their own weights, so as to be inserted between the first weight scale 21 and the supporting table 12. In so doing, the excretion tray 13 is located above the first weight scale 21. This causes the excretion tray 13 to be supported by the first weight scale 21 and to be separated from the carrier member 16, while the carrier member 16 is sliding off. That is, (i) the carrier member 16 comes down so as to leave the excretion tray 13 on the first weight scale 21 and (ii) the excretion tray 13 is pushed to the given location beneath the supporting table 12 by the opening 16a and/or the rising part 16c of the carrier member 16.

Meanwhile, the third guide pin 34 slides on the transition part 31c of the second guide rail 31 so as to fall down. This causes the excretion tray 13 to be completely separated from the carrier member 16, so as to be supported by the first weight scale 21. Note that the transition part 31c of the second guide rail 31 is sharply inclined. This causes the carrier member 16 to be locked by its own weight so as not to fall out of the main container 10.

As illustrated in of FIG. 4, the carrier member 16 bumps against the barrier wall 35, so that the attachment of the carrier member 16 and the excretion tray 13 is completed. The transition part 30c of the first guide rail 30 is connected to a substantially horizontal lower part 30d (another part of attachment guide). The transition part 31c of the second guide rail 31 is connected to a substantially horizontal lower part 31d.

Next, the following description will discuss, with reference to FIG. 2, a state where the attachment of the excretion tray 13 and the carrier member 16 is completed.

The carrier member 16 is supported, not by the first weight scale 21, but by the main container 10 via the first through third guide pins 32 through 34 and the first and second guide rails 30 and 31. The weight of the excretion tray 13 is supported by the first weight scale 21. The placement part 13b of the excretion tray 13 is located so as to be separated from the placement part 16b of the carrier member 16. It follows that the placement part 13b is not supported by the carrier member 16. This allows the first weight scale 21 to accurately measure the weight of the excretion. It is therefore possible to easily measure the weight of the excretion of an animal with the use of the first weight scale 21, without detaching the excretion tray 13 from the pet toilet 1.

The first guide pin 32 and the second guide pin 33 are located on the horizontal lower part 30d. The second guide pin 33 is located in the vicinity of a boundary between (i) the transition part 30c, which is inclined so as to decline toward downstream of the attachment direction and (ii) the horizontal lower part 30d. The third guide pin 34 is located on the horizontal lower part 31d so as to be in the vicinity of a boundary between (i) the transition part 31c, which is inclined so as to decline toward downstream of the attachment direction and (ii) the horizontal lower part 31d. A side surface of the carrier member 16, which side surface is located downstream of the attachment direction, bumps against the barrier wall 35. The carrier member 16 is accurately held in a given location in the main container 10. The carrier member 16 defines a location of the excretion tray 13. The excretion tray 13 is accurately held, in a given location beneath the supporting table 12, by the opening 16a of and/or the rising part 16c of the carrier member 16. It is therefore possible to easily attach, with the use of the carrier member 16, the excretion tray 13 in a given location between the supporting table 12 and the first weight scale 21. Since it is further possible to stabilize the location of the excretion tray 13, the weight of the excretion can be measured with high accuracy.

(Detachment of Excretion Tray and Carrier Member)

The user lifts the handle part 16d of the carrier member 16 so that the third guide pin 34 is located higher than the transition part 31c of the second guide rail 31. This causes the carrier member 16 to be released from being locked due to its own weight, and ultimately allows the carrier member 16 to be drawn out. In contrast to the attachment, the transition part 30c of the first guide rail 30 allows the carrier member 16 to be lifted while being drawn out. The carrier member 16 lifts the excretion tray 13 from the first weight scale 21 while pushing out the excretion tray 13, so that the excretion tray 13 is located within the carrier member 16. The carrier member 16 and the excretion tray 13 are then drawn out from between the first weight scale 21 and the supporting table 12.

Then, the user continues to draw out the carrier member 16 and the excretion tray 13 so that the first guide pin 32 and the second guide pin 33 slide on the upper part 30b of the first guide rail 30. The carrier member 16 carries the excretion tray 13 so that the excretion tray 13 does not make contact with the first weight scale 21. Finally, the carrier member 16 and the excretion tray 13 are detached from the space secured in the side surface of the main container 10.

Embodiment 2

The following description will discuss Embodiment 2 of the present invention. For convenience, members having functions identical to those described in Embodiment 1 are given the same reference numerals, and the descriptions of such members are omitted.

Figure 5:
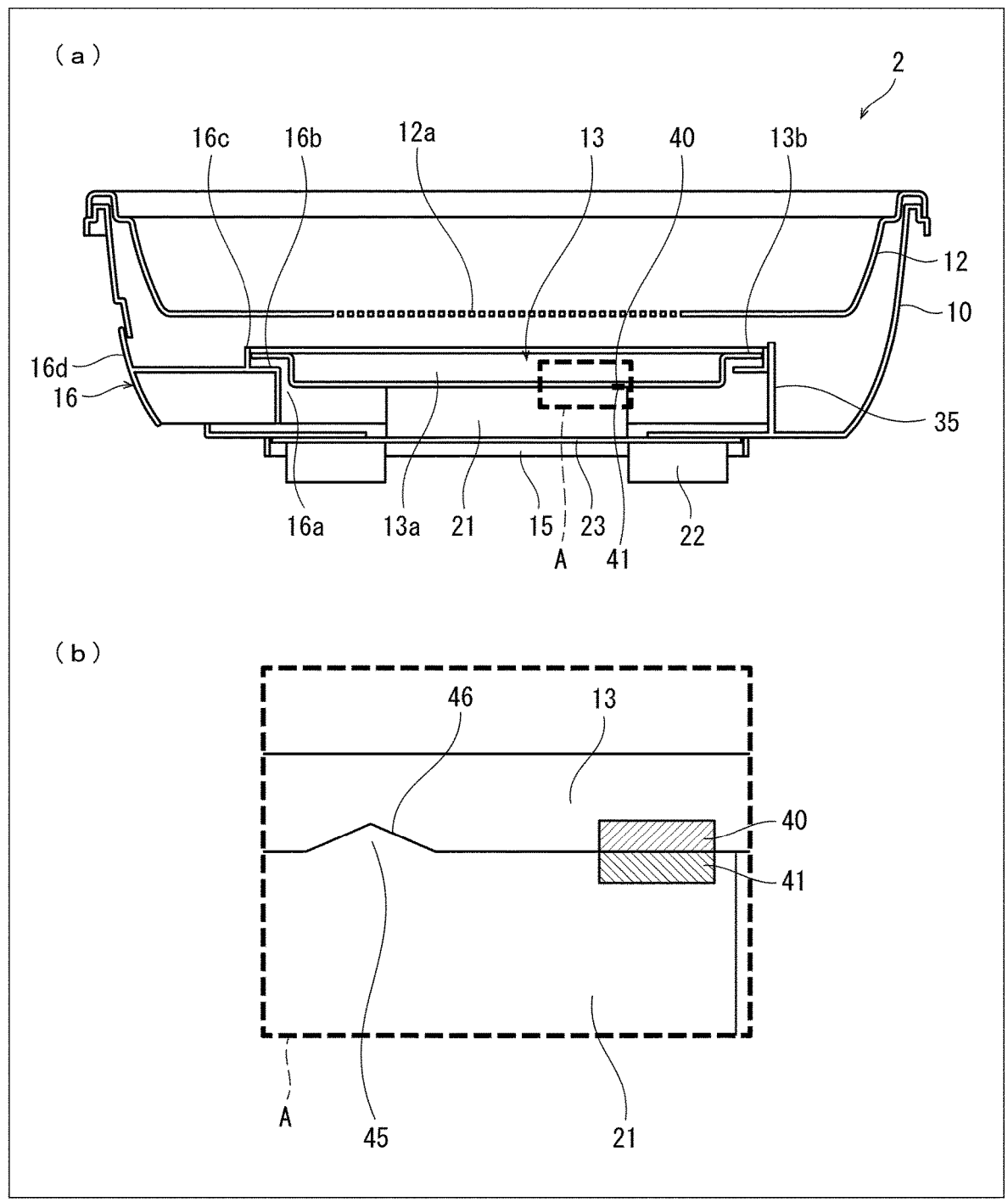
FIG. 5A is a cross-sectional view illustrating a configuration of a pet toilet in accordance with Embodiment 2 of the present invention, the cross-sectional view being taken in a direction in which a carrier member is attached.
FIG. 5B is an enlarged view of box A in FIG. 5A.
Figure 6:
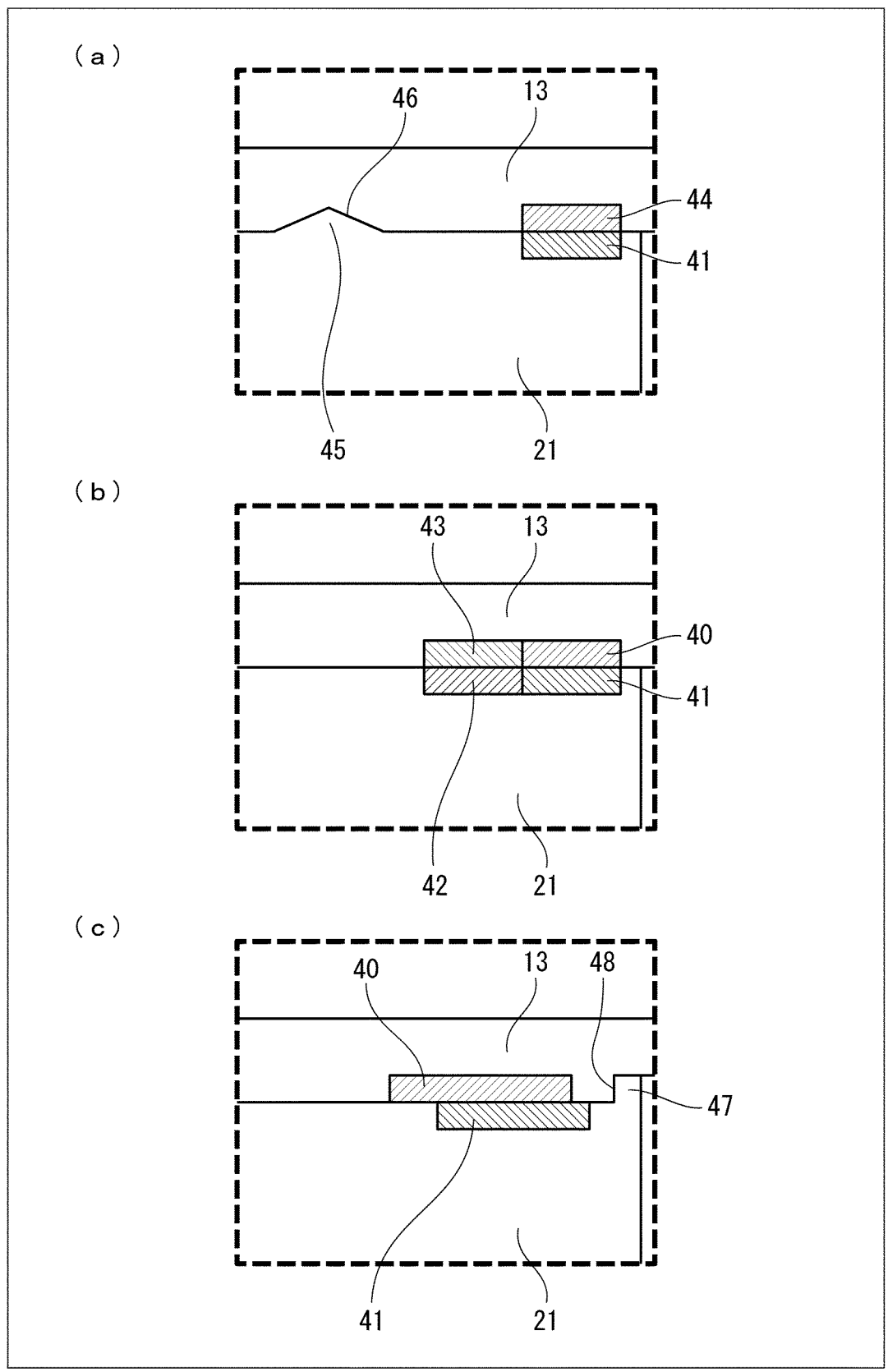
FIGS. 6A-6C is a cross-sectional view illustrating a variation of the pet toilet illustrated in FIG. 5.

FIG. 5 is a cross-sectional view of a pet toilet 2, the cross-sectional view being taken in a direction in which a carrier member 16 is attached of FIG. 5 is a cross-sectional view of a center part of the carrier member 16, and corresponds to (b) of FIG. 2. (b) of FIG. 5 is an enlarged view of a box A illustrated in (a) of FIG. 5. (a) through (c) of FIG. 6 are cross-sectional views illustrating respective Variations 1 through 3 of an excretion tray 13 and a first weight scale 21 of the pet toilet 2, and each correspond to (b) of FIG. 5.

The pet toilet 2 (animal toilet) serves as a measurement device which measures (i) a weight of an animal (i.e., pet) and (ii) a weight of an excretion of the animal. The pet toilet 2 includes a main container 10 (member other than weight scale), a cover 11, a supporting table 12, the excretion tray 13 (measurement tray), an absorbing sheet 14, a supporting member 15, the carrier member 16, the first weight scale 21 (weight scale), second weight scales 22, and a control device 23. The cover 11 is omitted in each of FIGS. 5 and 6.

The pet toilet 2 is identical to the pet toilet 1 in accordance with Embodiment 1, except for the following (1) and (2). (1) (i) A first magnet 40 is provided on a bottom surface of a receiving part 13a of the excretion tray 13 and (ii) a second magnet 41 is provided on an upper surface of the first weight scale 21. (2) (a) a recess 46 is provided in the bottom surface of the receiving part 13a of the excretion tray 13 and (b) a projection 45 is provided on the upper surface of the first weight scale 21.

The first magnet 40 and the second magnet 41 are provided on the excretion tray 13 and the first weight scale 21, respectively, so that (i) they overlap each other and (ii) their magnetic poles are different from each other so as to attract each other in a case where the excretion tray 13 is in a given location beneath the supporting table 12. This causes magnetic attractive force to be acted on the first magnet 40 and the second magnet 41, and ultimately causes the excretion tray 13 to be attracted to the first weight scale 21 by the magnetic attractive force (i.e., magnetic force) acted on the first magnet 40 and the second magnet 41. It is therefore possible to stabilize a location of the excretion tray 13, and ultimately makes it possible to measure the weight of the excretion with high accuracy.

The projection 45 and the recess 46 in accordance with Embodiment 2 are provided upstream of the first magnet 40 and the second magnet 41 in an attachment direction, respectively. The projection 45 is fitted in the recess 46 and the excretion tray 13 is in proximity to the first weight scale 21, while the excretion tray 13 is in a given location beneath the supporting table 12. The projection 45 is not fitted in the recess 46 so as to lift the excretion tray 13, while the excretion tray 13 is being drawn out. This causes the excretion tray 13 and the first magnet 40 to be separated from the first weight scale 21 and the second magnet 41, respectively. The magnetic attractive force, acted on the first magnet 40 and the second magnet 41, rapidly decreases in accordance with a distance between the first magnet 40 and the second magnet 41. This facilitates (i) sliding the excretion tray 13 on the first weight scale 21 and (ii) lifting the excretion tray 13 from the first weight scale 21.

(Variation 1)

Any one of the first magnet 40 and the second magnet 41 can be replaced with a ferromagnetic substance.

Even in a case where the first magnet 40 is replaced with a piece of iron 44 (see (a) of FIG. 6), magnetic attractive force acts on the piece of iron 44 and the second magnet 41 while the excretion tray 13 is in a given location beneath the supporting table 12.

(Variation 2)

A further magnet can be provided instead of the projection 45 so that magnetic repulsion force acts while the excretion tray 13 is being drawn out.

As illustrated in (b) of FIG. 6, (i) a fourth magnet 43 is further provided on a bottom surface of a receiving part 13a of the excretion tray 13 in addition to the first magnet 40 and (ii) a third magnet 42 is further provided on an upper surface of the first weight scale 21 in addition to the second magnet 41.

The third magnet 42 and the fourth magnet 43 are located upstream of the attachment direction. The third magnet 42 and the fourth magnet 43 are provided on the first weight scale 21 and the excretion tray 13 so as to be adjacent to the second magnet 41 and the first magnet 40, respectively, so that (i) they overlap each other and (ii) their magnetic poles are different from each other so as to attract each other in a case where the excretion tray 13 is in a given location beneath the supporting table 12. This causes magnetic attractive force to be acted on the third magnet 42 and the fourth magnet 43, and ultimately causes the excretion tray 13 to be attracted to the first weight scale 21 by the magnetic attractive force acted on the first magnet 40 and the second magnet 41. It is therefore possible to stabilize the location of the excretion tray 13, and ultimately makes it possible to measure the weight of the excretion with high accuracy.

The first magnet 40 (first magnet) the third magnet 42 (second magnet) are provided on the excretion tray 13 and the first weight scale 21, respectively, so that (i) they overlap each other and (ii) their identical magnetic poles face each other so as to repel each other while the excretion tray 13 is being drawn out. Magnetic repulsion force acted on the first magnet 40 and the third magnet 42 causes the excretion tray 13 to be lifted from the first weight scale 21. This facilitates (i) sliding the excretion tray 13 on the first weight scale 21 and (ii) lifting the excretion tray 13 from the first weight scale 21. Note that a configuration can be employed in which the first magnet 40, the second magnet 41, and the third magnet 42 are provided without the fourth magnet 43. In such a configuration, the second magnet 41 can be replaced with a ferromagnetic substance. Alternatively, a configuration can be employed in which the first magnet 40, the third magnet 42, and the fourth magnet 43 are provided without the second magnet 41. In such a configuration, the fourth magnet 43 can be replaced with a ferromagnetic substance.

(Variation 3)

A first magnet 40 and a second magnet 41 can be provided on an excretion tray 13 and a first weight scale 21, respectively, so that the first magnet 40 and the second magnet 41 partially overlap each other, while the excretion tray 13 is in a given location beneath a supporting table 12.

The first magnet 40 is provided so as to be located upstream of a third magnet 42 in an attachment direction, while the excretion tray 13 is in the given location beneath the supporting table 12 (see (c) of FIG. 6). A horizontal component of the magnetic attractive force between the first magnet 40 and the second magnet 41 causes the excretion tray 13 to be drawn toward downstream of the attachment direction, while the excretion tray 13 is in the given location beneath the supporting table 12.

Furthermore, the excretion tray 13 and the first weight scale 21 have a step part 48 (part of measurement tray) and a stopper part 47 (part of weight scale), respectively, so that the step part 48 of the excretion tray 13 bumps against the stopper part 47 of the first weight scale 21 when the excretion tray 13 reaches the given location beneath the supporting table 12. Positioning of the excretion tray 13 is made in response to the step part 48 bumping against the stopper part 47, so that the excretion tray 13 does not move beyond a given location between the supporting table 12 and the first weight scale 21 and toward downstream of the attachment direction. This makes it possible to stabilize the location of the excretion tray 13, and ultimately makes it possible to measure the weight of an excretion with high accuracy.

Note that the first magnet 40 and the second magnet 41 are already out of alignment at a time point when the excretion tray 13 is in a given location beneath the supporting table 12. This facilitates (i) sliding the excretion tray 13 on the first weight scale 21 and (ii) lifting the excretion tray 13 from the first weight scale 21, while the excretion tray 13 is being drawn out.

Embodiment 3

The following description will discuss Embodiment 3 of the present invention. For convenience, members having functions identical to those described in Embodiments 1 and are given the same reference numerals, and the descriptions of such members are omitted.

Figure 7:
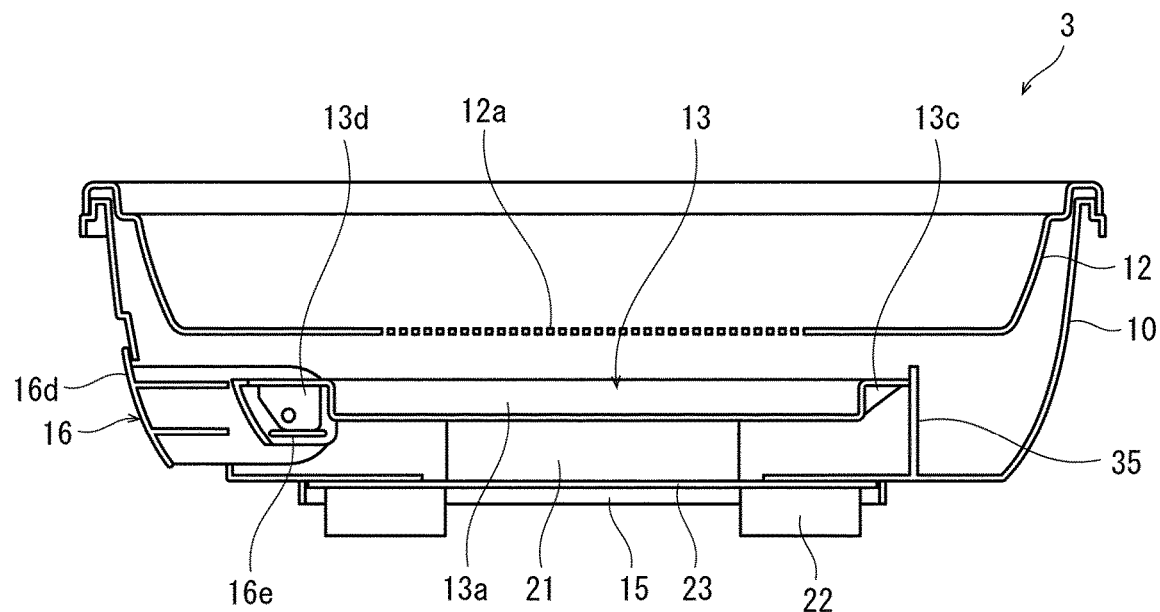
FIG. 7 is a cross-sectional view illustrating a configuration of a pet toilet in accordance with Embodiment 3 of the present invention, the cross-sectional view being taken in a direction in which a carrier member is attached.
Figure 8:
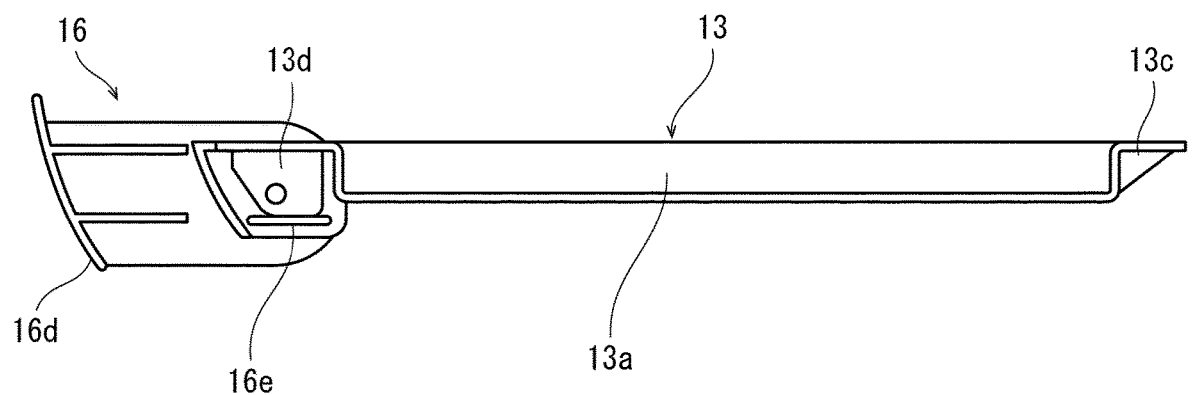
FIG. 8 is a cross-sectional view of an excretion tray and the carrier member of the pet toilet illustrated in FIG. 7.
Figure 9:
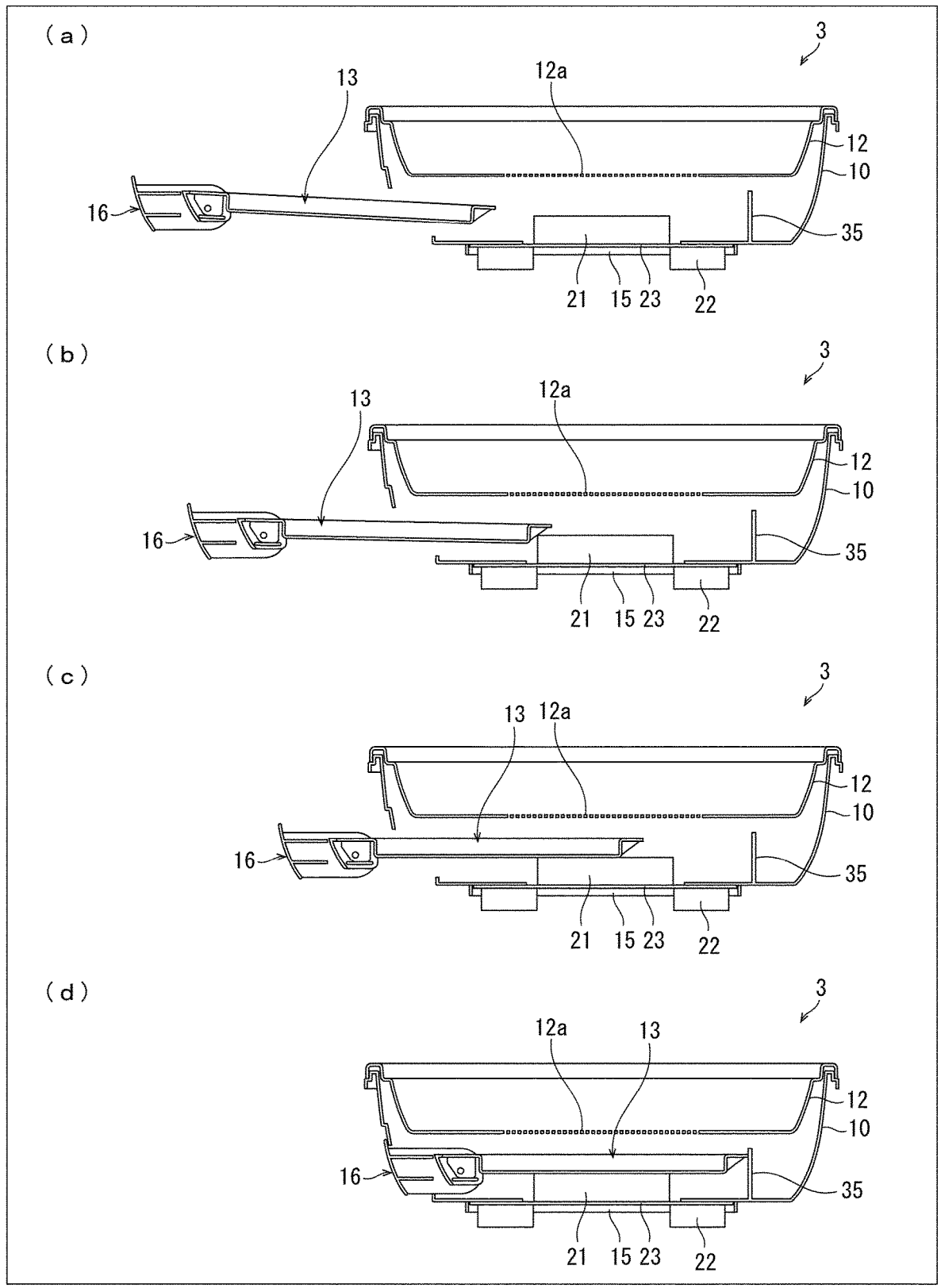
FIGS. 9A-9D is a cross-sectional view illustrating how the excretion tray and the carrier member are attached to the pet toilet illustrated in FIG. 1.

FIG. 7 is a cross-sectional view of a pet toilet 3, the cross-sectional view being taken in a direction in which a carrier member 16 is attached. FIG. 8 is a cross-sectional view of an excretion tray 13 and the carrier member 16. FIG. 9 is a cross-sectional view illustrating how the excretion tray 13 and the carrier member 16 are attached to the pet toilet 1. (a) of FIG. 9 illustrates how the attachment is started. (b) of FIG. 9 illustrates how the excretion tray 13 runs onto a first weight scale 21. (c) of FIG. 9 illustrates how the excretion tray 13 slides on the first weight scale 21. (d) of FIG. 9 illustrates a state where the attachment is completed.

The pet toilet 3 (animal toilet) serves as a measurement device which measures (i) a weight of an animal (i.e., pet) and (ii) a weight of an excretion of the animal. The pet toilet 3 includes a main container 10 (member other than weight scale), a cover 11, a supporting table 12, the excretion tray 13 (measurement tray), an absorbing sheet 14, a supporting member 15, the carrier member 16, a first weight scale 21 (weight scale), second weight scales 22, and a control device 23. The cover 11 is omitted in each of FIGS. 7 through 9.

The pet toilet 3 is identical to the pet toilet 1 in accordance with Embodiment 1, except for the following (1) and (2). (1) No guide structure is provided which is composed of the first guide rails 30, the second guide rails 31, the first guide pins 32, the second guide pins 33, and the third guide pins 34. (2) The excretion tray 13 is rotatably connected to the carrier member 16.

(Configurations of Excretion Tray and Carrier Member)

The following description will first discuss respective configurations of the excretion tray 13 and the carrier member 16.

The excretion tray 13 has (i) a receiving part 13a which receives the excretion of an animal, (ii) a leading part 13c which allows the excretion tray 13 to run onto the first weight scale 21, and (iii) a connecting part 13d which is rotatably connected to the carrier member 16. Although not illustrated, a rib is provided, in the attachment direction, on a bottom surface of the receiving part 13a. The leading part 13c is inclined so as to rise toward downstream of the attachment direction.

The carrier member 16 is composed of (i) a connecting part 16e which is rotatably connected to the connecting part 13d of the excretion tray 13 and (ii) a handle part 16d, provided upstream of the attachment direction, which serves as a handle during the attachment and the detachment. The connecting part 13d of the excretion tray 13 has a small hole, in which a connecting pin of the connecting part 16e of the carrier member 16 is fitted so as to be rotatable within a given angular range.

(Attachment and Detachment of Excretion Tray and Carrier Member)

The following description will discuss how the excretion tray 13 and the carrier member 16 are attached by insertion between the supporting table 12 and the first weight scale 21.

As illustrated in (a) of FIG. 9, a user grips the handle part 16d of the carrier member 16, to which the excretion tray 13 has been connected, and starts to attach the carrier member 16 and the excretion tray 13 together to a space secured in a side surface of the main container 10.

As illustrated in (b) of FIG. 9, the leading part 13c of the excretion tray 13 reaches an upstream corner of an upper surface of the first weight scale 21. This allows the excretion tray 13 to run onto the upper surface of the first weight scale 21.

As illustrated in (c) of FIG. 9, the user continues to attach the carrier member 16, to which the excretion tray 13 has been connected, by insertion so that the bottom surface of the receiving part 13a of the excretion tray 13 slides on the upper surface of the first weight scale 21.

As illustrated in (d) of FIG. 9, a leading edge of the leading part 13c of the excretion tray 13 bumps against the barrier wall 35. This causes the carrier member 16 to be directly supported by and fixed to the main container 10, in a state where the excretion tray 13 and the carrier member 16 are inserted in an innermost part of the space. Since the excretion tray 13 is provided so as to be rotatable with respect to the carrier member 16, a weight of the excretion tray 13 is supported by the first weight scale 21 in a given location beneath the supporting table 12.

In contrast to the attachment, the user detaches the carrier member 16, to which the excretion tray 13 has been connected, by (i) gripping the handle part 16d of the carrier member 16 and (ii) drawing out the carrier member 16 from the space secured in the side surface of the main container 10.

Similar to Embodiment 1, it is therefore possible to easily attach, with the use of the carrier member 16, the excretion tray 13 by insertion between the first weight scale 21 and the supporting table 12, without providing a specific guide mechanism including the first guide rails 30, the second guide rails 31, the first guide pins 32, the second guide pins 33, and the third guide pins 34. Although no guide mechanism is provided, the excretion tray 13 can be placed on and supported by the first weight scale 21, similarly to Embodiment 1, in a state where the attachment by insertion is completed. The carrier member 16 is, as with Embodiment 1, supported by the main container 10 in a state where the attachment by insertion is completed. Nevertheless, since the excretion tray 13 is provided so as to be rotatable with respect to the carrier member 16, a weight of the carrier member 16 does not adversely affect a measurement of the first weight scale 21.

Note that Embodiments 1 through 3 discuss the cases in each of which the animal toilet (pet toilet 1, 2, or 3) includes the second weight scale 22 which measures the weight of the animal on the supporting table. However, it is not fundamental for the present invention to have a function of measuring the weight of an animal, provided that it has a function of measuring the weight of an excretion.

Each of Embodiments 1 through 3 discusses the configuration in which (i) the carrier member 16 has guide pins and (ii) the main container 10 has guide rails 30 and 31. The present invention is, however, not limited as such. Alternatively, the present invention can employ a configuration in which (i) a carrier member 16 has guide rails and (ii) a main container 10 has pins provided therein.

Recap

An animal toilet (pet toilet 1, 2, 3) in accordance with a first aspect of the present invention includes: a supporting table (12) onto which an animal is to step; a measurement tray (excretion tray 13) configured to receive an excretion (urine) of the animal which excretion (urine) falls from the supporting table; a weight scale (first weight scale 21) configured to measure a weight of the measurement tray; and a carrier member (16) configured to carry the measurement tray, the measurement tray and the carrier member being provided to be attachable together by insertion between the weight scale and the supporting table, and (i) the carrier member being supported by a member (main container 10) other than the weight scale and (ii) the weight scale supporting the weight of the measurement tray, in a state where the measurement tray is attached by insertion between the weight scale and the supporting table.

With the configuration, it is possible to easily place, with the use of the carrier member, the measurement tray between the supporting table and the weight scale. The measurement tray receives the excretion of the animal on the supporting table. Furthermore, the carrier member is supported by a member other than the weight scale. This allows the weight scale to accurately measure a weight of the excretion. It is therefore possible to easily measure the weight of the excretion of the animal, without detaching the measurement tray from the animal toilet.

The animal toilet (pet toilet 1, 2) in accordance with a second aspect of the present invention can be configured such that, in the first aspect of the present invention, the carrier member (16) places thereon and carries the measurement tray (excretion tray 13); and the measurement tray is separated from the carrier member and placed on the weight scale, in the state where the measurement tray is attached by insertion between the weight scale (first weight scale 21) and the supporting table.

With the configuration, the carrier member places thereon and carries the measurement tray. This makes it possible to simplify respective configurations of the carrier member and the measurement tray, and ultimately facilitates cleaning and sterilization of the carrier member and the measurement tray. The measurement tray is separated from the carrier member and the carrier member is supported by a member other than the weight scale, in a state where the measurement tray is attached by insertion between the weight scale and the supporting table. This allows the weight scale to securely support the weight of the measurement tray.

The animal toilet (pet toilet 1, 2) in accordance with a third aspect of the present invention can be configured to further include, in the first or second aspect of the present invention, an attachment guide (first guide rail 30) which causes the carrier member (16) to slide, a part (upper part 30b) of the attachment guide being made higher than other parts (lower part 30d) of the attachment guide so that the attachment guide lifts the carrier member while the carrier member is being drawn out.

With the configuration, the part of the attachment guide lifts the carrier member while the carrier member is being drawn out. The carrier member thus lifts the measurement tray from the weight scale, and the measurement tray and the carrier member can be drawn out together from between the weight scale and the supporting table.

The animal toilet (pet toilet 2) in accordance with a fourth aspect of the present invention can be configured such that, in any one of the first through third aspects of the present invention, the measurement tray is attracted to the weight scale by magnetic force (magnetic attractive force), in the state where the measurement tray (excretion tray 13) is attached by insertion between the weight scale (first weight scale 21) and the supporting table (12).

With the configuration, the measurement tray is attracted to the weight scale by the magnetic force. This makes it possible to stabilize the measurement tray above the weight scale, and ultimately allows the weight of the excretion to be measured by the weight scale with high accuracy.

The animal toilet (pet toilet 2) in accordance with a fifth aspect of the present invention can be configured such that, in the fourth aspect of the present invention, the weight scale (first weight scale 21) has a projection (45) on an upper surface thereof; and the projection lifts the measurement tray while the measurement tray (excretion tray is being drawn out.

With the configuration, the projection lifts the measurement tray while the measurement tray is being drawn out. This causes the magnetic force that attracts the measurement tray to the weight scale to be weakened, and ultimately facilitates sliding the measurement tray.

The animal toilet (pet toilet 2) in accordance with a sixth aspect of the present invention can be configured such that, in the fourth or fifth aspect of the present invention, the measurement tray (excretion tray 13) includes a first magnet (first magnet 40); the weight scale (first weight scale 21) includes a second magnet (third magnet 42); the measurement tray is attracted to the weight scale by magnetic force (magnetic attractive force) caused by the first magnet or the second magnet, in the state where the measurement tray is attached by insertion between the weight scale and the supporting table; and the first magnet repels the second magnet, while the measurement tray is being drawn out.

With the configuration, the first magnet repels the second magnet while the measurement tray is being drawn out. This causes the measurement tray to be lifted, and ultimately facilitates sliding (detaching) the measurement tray.

The animal toilet (pet toilet 2) in accordance with a seventh aspect of the present invention can be configured such that, in any one of the fourth through sixth aspects of the present invention, positioning of the measurement tray is made in response to a part (step part 48) of the measurement tray (excretion tray 13), which is attached by insertion, bumping against a part (stopper part 47) of the weight scale (first weight scale 21).

With the configuration, positioning of the measurement tray is made in response to the part of the measurement tray bumping against the part of the weight scale. This makes it possible to stabilize a location of the measurement tray, and ultimately allows the weight of the excretion to be measured with high accuracy.

The animal toilet (pet toilet 3) in accordance with an eighth aspect of the present invention can be configured such that, in the first aspect of the present invention, the measurement tray (excretion tray 13) is rotatably connected to the carrier member (16).

The animal toilet (pet toilet 1, 2, 3) of a ninth aspect of the present invention can be configured such that, in any one of the first through eighth aspects of the present invention, the supporting table (12) has a hole or a mesh (12a) which allows the excretion (urine) to pass therethrough.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1, 2, 3: Pet toilet (animal toilet)
10: Main container (member other than weight scale)
12: Supporting table
12a: Mesh
13: Excretion tray (measurement tray)
16: Carrier member
21: First weight scale (weight scale)
22: Second weight scale
30: First guide rail (attachment guide)
30b: Upper part (part of attachment guide)
30d: Lower part (another part of attachment guide)
40: First magnet (first magnet)
42: Third magnet (second magnet)
45: Projection
47: Stopper part (part of weight scale)
48: Step part (part of measurement tray)

The invention claimed is:

1. An animal toilet, comprising:
a supporting table onto which an animal is to step;
a measurement tray configured to receive an excretion of the animal which excretion falls from the supporting table;
a weight scale configured to measure a weight of the measurement tray; and
a carrier member configured to carry the measurement tray,
the measurement tray and the carrier member being provided to be attachable together by insertion between the weight scale and the supporting table, and
(i) the carrier member being supported by a member other than the weight scale and (ii) the weight scale supporting the weight of the measurement tray, in a state where the measurement tray is attached by insertion between the weight scale and the supporting table.

2. The animal toilet as set forth in claim 1, wherein:
the carrier member places thereon and carries the measurement tray; and
the measurement tray is separated from the carrier member and placed on the weight scale, in the state where the measurement tray is attached by insertion between the weight scale and the supporting table.

3. An animal toilet as set forth in claim 1, further comprising:
an attachment guide which causes the carrier member to slide,
a part of the attachment guide being made higher than other parts of the attachment guide so that the attachment guide lifts the carrier member while the carrier member is being drawn out.

4. The animal toilet as set forth in claim 1, wherein:
the measurement tray is attracted to the weight scale by magnetic force, in the state where the measurement tray is attached by insertion between the weight scale and the supporting table.

5. The animal toilet as set forth in claim 4, wherein:
the weight scale has a projection on an upper surface thereof; and
the projection lifts the measurement tray while the measurement tray is being drawn out.

6. The animal toilet as set forth in claim 4, wherein:
the measurement tray includes a first magnet;
the weight scale includes a second magnet;
the measurement tray is attracted to the weight scale by magnetic force caused by the first magnet or the second magnet, in the state where the measurement tray is attached by insertion between the weight scale and the supporting table; and
the first magnet repels the second magnet, while the measurement tray is being drawn out.

7. The animal toilet as set forth in claim 4, wherein:
positioning of the measurement tray is made in response to a part of the measurement tray, which is attached by insertion, bumping against a part of the weight scale.

8. The animal toilet as set forth in claim 1, wherein:
the measurement tray is rotatably connected to the carrier member.

9. The animal toilet as set forth in claim 1, wherein:
the supporting table has a hole or a mesh which allows the excretion to pass therethrough.

* * * * *